(12) United States Patent
Shin et al.

(10) Patent No.: US 11,186,132 B2
(45) Date of Patent: Nov. 30, 2021

(54) SUSPENSION SYSTEM FOR VEHICLE (71) Applicants: Hyundai Motor Company, Seoul (KR); Kia Motors Corporation, Seoul (KR); Seoul National University R&DB Foundation, Seoul (KR)

(72) Inventors: Dongil Shin, Seoul (KR); Sang Min Han, Seoul (KR); Suh In Kim, Gwacheon-si (KR); Seok Won Kang, Gwangju-si (KR); Yoon Young Kim, Seoul (KR); Yong Sub Yi, Suwon-si (KR); Moon Won Kang, Seongnam-si (KR); Seungmin Kwon, Seoul (KR)

(73) Assignees: Hyundai Motor Company, Seoul (KR); Kia Motors Corporation, Seoul (KR); Seoul National University R&DB Foundation, Seoul (KR)

( * ) Notice: Subject to any disclaimer, the term of this patent is extended or adjusted under 35 U.S.C. 154(b) by 180 days.

(21) Appl. No.: 16/598,997

(22) Filed: Oct. 10, 2019

(65) Prior Publication Data

US 2020/0189342 A1 Jun. 18, 2020

(30) Foreign Application Priority Data

Dec. 13, 2018 (KR) .................. 10-2018-0161197

(51) Int. Cl.
*B60G 7/02* (2006.01)
*B60G 3/20* (2006.01)

(52) U.S. Cl.
CPC .............. *B60G 7/02* (2013.01); *B60G 3/20* (2013.01); *B60G 2200/144* (2013.01); *B60G 2200/18* (2013.01)

(58) Field of Classification Search
CPC ...... B60G 7/02; B60G 3/20; B60G 2200/144; B60G 2200/18; B60G 2204/143;
(Continued)

(56) References Cited

U.S. PATENT DOCUMENTS

| 2,913,251 | A | * | 11/1959 | Herbenar | ................ | F16C 11/04 |
| | | | | | | 280/124.136 |
| 5,284,353 | A | * | 2/1994 | Shinji | ...................... | B60G 3/20 |
| | | | | | | 280/124.136 |

(Continued)

FOREIGN PATENT DOCUMENTS

| JP | 2015-66968 A | 4/2015 |
| JP | 2016-11042 A | 1/2016 |
| KR | 10-2009-0064976 A | 6/2009 |

*Primary Examiner* — Darlene P Condra
(74) *Attorney, Agent, or Firm* — Morgan, Lewis & Bockius LLP (57) ABSTRACT

A suspension system for a vehicle may include a knuckle rotatably supporting a wheel, and a lower control arm disposed along a vehicle's width direction and connecting the knuckle and a vehicle body, wherein the lower control arm includes a wheel-side end portion connected to a lower portion of the knuckle through a front lower external joint and a rear lower external joint, and two vehicle body-side end portions connected to the vehicle body through a front lower inner joint and a rear lower inner joint, the two vehicle body-side end portions including first and second vehicle body-side end portions, wherein the first vehicle body-side end portion among the two vehicle body-side end portions is connected to the vehicle body interposing a compliance control arm between the first vehicle body-side end portion and the vehicle body.

19 Claims, 4 Drawing Sheets

(58) Field of Classification Search
CPC .... B60G 2204/421; B60G 2400/05142; B60G 2400/05144; B60G 2200/46; B60G 2200/462; B60G 7/001; B60G 7/00
See application file for complete search history.

(56) References Cited

U.S. PATENT DOCUMENTS

| | | | | |
|---|---|---|---|---|
| 5,415,426 A * | 5/1995 | Strasser | ................ | B60G 3/18 280/124.136 |
| 5,415,427 A * | 5/1995 | Sommerer | ............ | B60G 3/20 280/124.135 |
| 5,498,019 A * | 3/1996 | Adato | ................... | B60G 3/26 280/124.136 |
| 7,784,806 B2 | 8/2010 | Schmidt et al. | | |
| 7,950,680 B2 * | 5/2011 | Christensen | ............ | B60G 3/26 280/124.135 |
| 8,444,160 B2 * | 5/2013 | Okamoto | ............... | B60G 3/20 280/124.135 |
| 8,662,510 B2 * | 3/2014 | Christensen | ............ | B60G 7/02 280/124.148 |
| 8,794,647 B2 * | 8/2014 | Moessinger | .......... | B60G 7/001 280/124.138 |
| 2005/0280241 A1 * | 12/2005 | Bordini | ................ | B62D 9/00 280/124.135 |

* cited by examiner

SUSPENSION SYSTEM FOR VEHICLE

CROSS-REFERENCE TO RELATED APPLICATION

The present application claims priority to Korean Patent Application No. 10-2018-0161197 filed on Dec. 13, 2018, the entire contents of which is incorporated herein for all purposes by this reference.

BACKGROUND OF THE INVENTION

Field of the Invention

The present invention relates to a suspension system for a vehicle.

Description of Related Art

A vehicle is typically provided with a suspension system between a drive axle and a vehicle body, as an apparatus configured for enhancing ride comfort and/or driving stability by reducing an impact or vibration transferred from a road surface while running of the vehicle.

Such a suspension system provides several functions of a vehicle. The suspension system provides ride comfort by cutting off an irregular impact input from a road surface from transmitting to a vehicle body. The suspension system also provides driving convenience by appropriately controlling wavering motion of the vehicle body caused by driving input of a driver or by an uneven road surface. The suspension system also provides driving traction of tires in cornering, braking, and acceleration by maintaining an appropriate vertical load on a tire contact surface.

To provide an optimized function of the suspension, controlling wheel alignment, e.g., tow-in and/or camber, plays an important role by suspension geometry characteristics. The direction of a wheel depends on relative motion to a vehicle body, and varying direction of a wheel affects an overall performance of a vehicle.

As an example of typical suspension, a multi-link type suspension employs at least three links as suspension components, to kinematically absorb an impact input from a road surface and wavering motion of a vehicle body.

Although such a multi-link type suspension actually achieves improvement in performance in comparison to classic suspensions, the multi-link type suspension also has limitation in optimally controlling the wheel alignment. The multi-link type suspension also show drawbacks in that, since a plurality of links may be included in a limited space, production cost increases due to increased number of parts, and spatial efficiency becomes deteriorated.

A double wishbone type suspension or a MacPherson strut type suspension may show better spatial efficiency compared to the multi-link type suspension. However, the double wishbone type suspension or a MacPherson strut type suspension may show a drawback of difficulty in tow-in control and lateral stiffness when applied with a lateral force and/or a braking force.

In particular, in the case of a suspension having an H-arm that has two knuckle-side connection points and two vehicle body-side connection points, ride comfort may deteriorate since the H-arm absorbs a majority of a driving torque and a braking force. Furthermore, such an H-arm suspension may show drawbacks that tow-in behavior characteristics is difficult to be satisfied in a response to both a lateral force input and a braking force input.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a suspension system for a vehicle having an advantage of improving compliance behavior characteristics, while maintaining vehicle dynamic behavior characteristics in a response to vertical motion of a vehicle body.

A suspension system for a vehicle the present invention according to an exemplary embodiment of the present invention may include a knuckle rotatably supporting a wheel, and at least one control arm disposed along a vehicle's width direction and connecting the knuckle and a vehicle body, the at least one control arm including a lower control arm disposed between the knuckle and the vehicle body. The lower control arm may include a wheel-side end portion connected to a lower portion of the knuckle through a front lower external joint and a rear lower external joint, and two vehicle body-side end portions connected to the vehicle body through a front lower inner joint and a rear lower inner joint, the two vehicle body-side end portions including first and second vehicle body-side end portions. One vehicle body-side end portion among the two vehicle body-side end portions may be connected to the vehicle body interposing a compliance control arm between the first vehicle body-side end portion and the vehicle body.

The compliance control arm may include a wheel-side connection end portion connected to the first vehicle body-side end portion of the lower control arm, and two vehicle body-side connection end portions including first and second vehicle body-side connection end portions and bifurcated from the wheel-side connection end portion of the compliance control arm toward the vehicle body and connected to the vehicle body. The one vehicle body-side end portion connected to the wheel-side connection end portion of the compliance control arm may be rearward of the second vehicle body-side end portion of the two vehicle body-side end portions.

The wheel-side connection end portion of the compliance control arm may be connected to a vehicle body-side rear end portion of the lower control arm through the rear lower inner joint. The two vehicle body-side connection end portions of the compliance control arm may be connected to the vehicle body through two compliance joints.

An arrangement direction of the front lower inner joint and an arrangement direction of the compliance control arm may be disposed such that an instantaneous rotation center of the lower control arm is located external and rearward of the wheel.

The two compliance joints may include upper and lower compliance joints that are vertically apart with respect to each other.

Each of the two compliance joints may include a ball joint or a bushing.

The compliance control arm may include a wheel-side connection end portion connected to the first vehicle body-side end portion of the lower control arm, and two vehicle body-side connection end portions including first and second vehicle body-side connection end portions and bifurcated from the wheel-side connection end portion of the compliance control arm toward the vehicle body and connected to the vehicle body. The one vehicle body-side end portion connected to the wheel-side connection end portion of the compliance control arm may be forward of the second vehicle body-side end portion of the two vehicle body-side end portions.

The wheel-side connection end portion of the compliance control arm may be connected to a vehicle body-side front end portion of the lower control arm through the front lower inner joint. The two vehicle body-side connection end portions of the compliance control arm may be connected to the vehicle body through two compliance joints.

The at least one control arm may further include an upper control arm disposed above the lower control arm.

The upper control arm may include a wheel-side end portion connected to the knuckle and a vehicle body-side end portion connected to the vehicle body.

The lower control arm may be formed as an H-arm including two wheel-side end portions connected to the knuckle and two vehicle body-side end portions connected to the vehicle body.

Each of the front lower inner joint and the rear lower inner joint may include a bushing or a ball joint.

According to a suspension system for a vehicle according to an exemplary embodiment of the present invention, a compliance control arm is employed between a vehicle body and a lower control arm of a suspension. By such an arrangement, compliance behavior characteristics may be improved, while maintaining vehicle dynamic behavior characteristics in a response to vertical motion of a vehicle body. Therefore, both ride comfort and driving stability (ride & handling) may be improved.

That is, the lower control arm may be adjusted by dynamic characteristics of the compliance control arm when a lateral force and/or a braking force (longitudinal force) are applied to the wheel. Therefore, more design degree of freedom may be obtained in designing compliance steer characteristics since desired tow-in behavior characteristics may be achieved while maintaining lateral stiffness.

Furthermore, a suspension system for a vehicle according to an exemplary embodiment of the present invention, a relative motion between the lower control arm and the compliance control arm is not caused when the wheel WH experience a vertical movement causing low deformation of bushings as in bounce and rebound motion. Therefore, a compliance behavior of a vehicle may be separately improved without altering vertical kinematic behavior of the wheel.

Furthermore, effects which may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Figure 1:
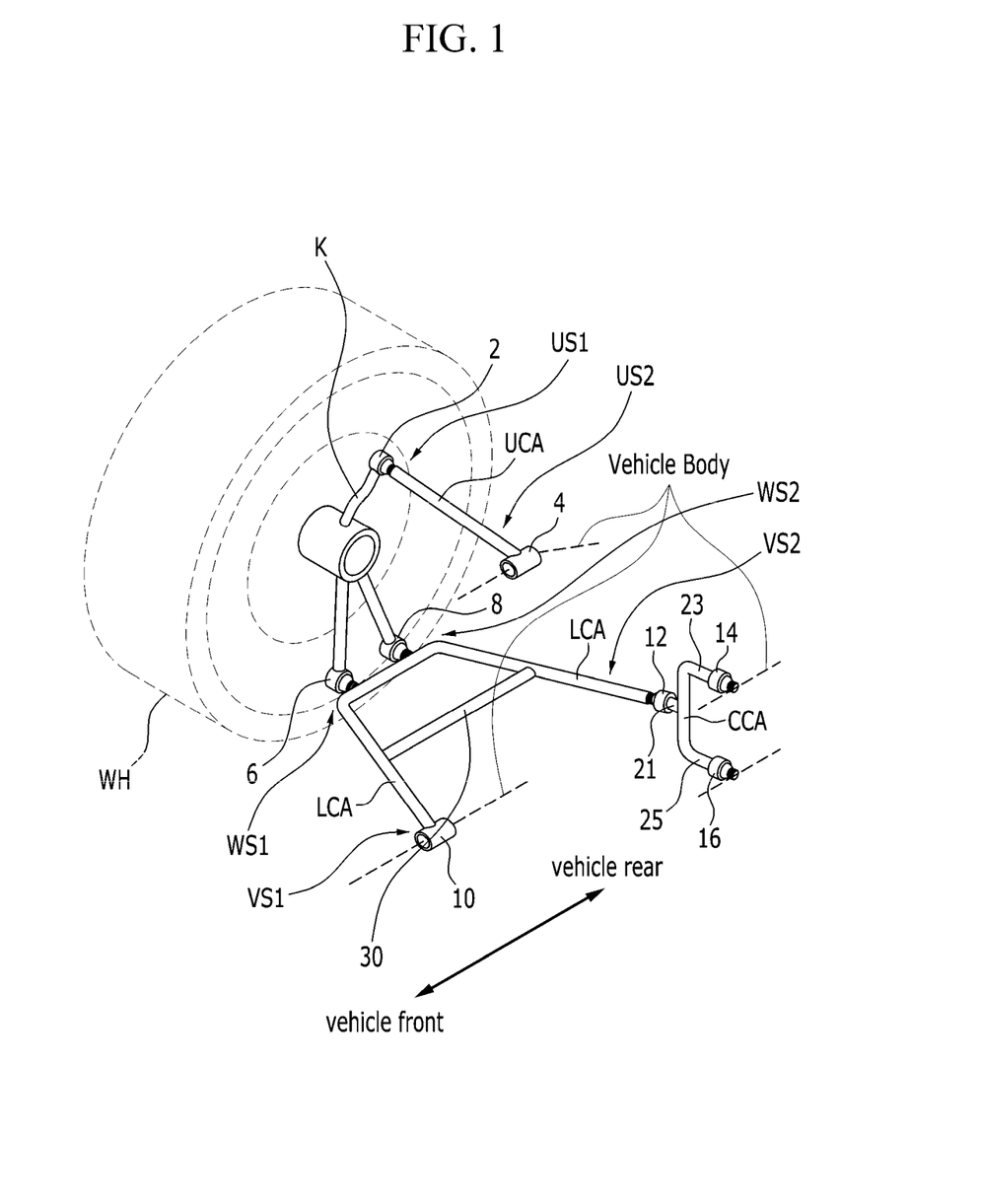
FIG. 1 is a perspective view of a suspension system for a vehicle according to various exemplary embodiments of the present invention.

FIG. 1 is a perspective view of a suspension system for a vehicle according to various exemplary embodiments of the present invention.

Referring to FIG. 1, a suspension system for a vehicle according to various exemplary embodiments of the present invention utilizes an upper control arm as a camber control link, and an H-arm as a lower control arm.

A suspension system for a vehicle according to various exemplary embodiments of the present invention includes a knuckle K, an upper control arm UCA, a lower control arm LCA, and a compliance control arm CCA. The suspension system also includes a damping device including a coil spring and a shock absorber.

A suspension system for a vehicle according to various exemplary embodiments of the present invention is not limited to a specific example, but may be applicable to another type of suspension, e.g., a MacPherson strut type suspension, a double wishbone type suspension, or a multi-link type suspension, having a lower control arm (or a lower arm) LCA to which a compliance control arm CCA is applicable.

The knuckle K rotatably supports a wheel WH.

The upper control arm UCA may be formed as a single arm, and is utilized as a camber control arm in the various exemplary embodiments of the present invention.

The upper control arm UCA is disposed in a vehicle width direction thereof. A wheel-side end portion US1 of the upper control arm UCA is connected to an upper end portion of the knuckle K to form an upper external joint 2, and a vehicle body-side end portion US2 of the upper control arm UCA is connected to a vehicle body to form an upper inner joint 4.

The lower control arm LCA may be formed as a single arm or two arms, and is realized as an H-arm in the various exemplary embodiments of the present invention.

Although the various exemplary embodiments of the present invention utilizes an H-arm as the lower control arm LCA, it may be understood that the present invention is not limited thereto, and the compliance control arm CCA may be applicable to an A-arm having one connection point at a knuckle side and two connections points at a vehicle body side.

The lower control arm LCA is disposed in a vehicle's width direction. Two wheel-side end portions WS1 and WS2 are connected to bottom portion of the knuckle K through a front lower external joint 6 and a rear lower external joint 8.

Among two vehicle body-side end portions VS1 and VS2 of the lower control arm LCA, a vehicle body-side front end portion VS1 is connected to the vehicle body through a front lower inner joint 10.

In an exemplary embodiment of the present invention, the two vehicle body-side end portions VS1 and VS2 of the lower control arm LCA are connected by a reinforcement member 30.

A vehicle body-side rear end portion VS2 of the lower control arm LCA is connected to the vehicle body through a rear lower inner joint 12 and a compliance control arm CCA.

The compliance control arm CCA includes a wheel-side connection end portion 21 facing the wheel WH and two vehicle body-side connection end portions 23 and 25 bifurcating from the wheel-side connection end portion 21 toward the vehicle body.

A rear lower inner joint 12 is formed at the wheel-side connection end portion 21, and the wheel-side connection end portion 21 of the compliance control arm CCA is connected to the vehicle body-side rear end portion of the lower control arm LCA through the wheel-side connection end portion 21. Two compliance joints 14 and 16 are formed at the two bifurcated vehicle body-side connection end portions 23 and 25, and the compliance control arm CCA is connected to the vehicle body through the compliance joints 14 and 16.

The two compliance joints 14 and 16 include an upper compliance joint 14 and a lower compliance joint 16. The upper and lower compliance joints 14 and 16 are vertically apart and are connected to the vehicle body.

The upper and lower compliance joints 14 and 16 being vertically apart does not necessarily mean that the upper and lower compliance joints 14 and 16 are disposed in an exactly vertical direction.

The upper and lower compliance joints 14 and 16 may be respectively formed as ball joints, however, are not limited thereto. Another element such as a bushing which may deform to vary an angle between the vehicle body and the compliance control arm CCA may be applicable as the upper and lower compliance joints 14 and 16.

In an exemplary embodiment of the present invention, drawings illustrate that ball joints are used for the upper external joint 2 of the upper control arm UCA, the front and rear lower external joints 6 and 8 and rear lower inner joint 12 of the lower control arm LCA, and the upper and lower compliance joints 14 and 16.

Furthermore, the drawings illustrate that bushings are used for the upper inner joint 4 of the upper control arm UCA and the front lower inner joint 10 of the lower control arm LCA.

As known in the art, a bushing includes a rubber material fitted between internal and external pipes of smaller and larger diameters, and such a bushing absorbs a load exerted to the wheel in length and width directions of a vehicle by deforming of the rubber material.

As known in the art, a ball joint includes a stud having a metal ball integrally formed with a rod and a socket spherically contacting the metal ball. In such a ball joint, the metal ball is rotatable with respect to the socket to provide relative motion of parts linked by the ball joint, and provides high strength against an applied force.

According to such a suspension system for a vehicle, when the wheel WH kinematically moves along a vertical direction, the compliance control arm CCA becomes stationary. Therefore, in the instant case, the lower control arm LCA of an H-arm type moves as if the rear lower inner joint 12 is fixed to the vehicle body.

Furthermore, the upper control arm UCA may adjust an instantaneous rotation center in a front view, as a function of a camber control link.

Figure 2:
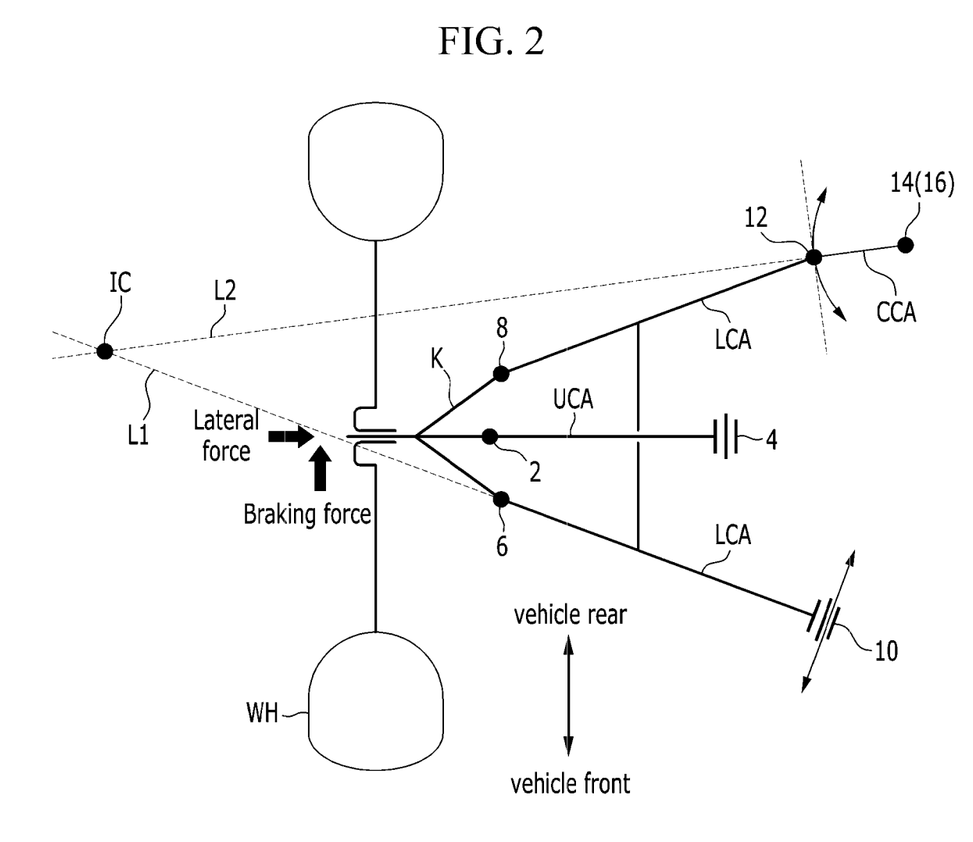
FIG. 2 is a schematic plan view of a suspension system for a vehicle according to various exemplary embodiments of the present invention.

FIG. 2 is a schematic plan view of a suspension system for a vehicle according to various exemplary embodiments of the present invention.

Referring to FIG. 2, the lower control arm LCA receives the driving torque and the braking force by torsion and bending, and the compliance dynamic characteristics of the wheel WH may be estimated based on an instantaneous rotation center IC. To increase tow-in behavior characteristics of the wheel WH while the lateral force and the braking force act on the wheel WH, an instantaneous rotation center IC of the lower control arm LCA is located external rear of the wheel WH.

The instantaneous rotation center IC of the lower control arm LCA is determined by the arrangement direction of the front lower inner joint 10 and the arrangement direction and location of the compliance control arm CCA.

The rear lower inner joint 12 may rotationally move around the upper and lower compliance joints 14 and 16 that are rear-side connection portions to the vehicle body. That is, the rear lower inner joint 12 may move along a line perpendicular to a straight line connecting the rear lower inner joint 12 and the upper and lower compliance joints 14 and 16, as illustrated by an arrow across the rear lower inner joint 12. That is, the rear lower inner joint 12 instantaneously moves vertically to an extension line L2 formed by the compliance control arm CCA.

The front lower inner joint 10 forming the front-side connection portion to the vehicle body may move along an axial direction of a bushing disposed therein, as illustrated by a straight arrow across the front lower inner joint 10. That is, the front lower inner joint 10 instantaneously moves vertically to an extension line L1 formed vertical to the axial direction of the front lower inner joint 10.

When an external force such as a lateral force or a braking force is applied to wheel WH, the lower control arm LCA may move according to compliance dynamic characteristics determined by the front-side and rear-side connection portions to the vehicle body.

In the instant case, the instantaneous rotation center IC of the lower control arm LCA is formed at a point where the two extension lines L1 and L2.

Therefore, when a lateral force and/or a braking force is applied to the wheel WH, a compliance motion of the compliance control arm CCA is caused, where the compliance control arm CCA rotates around the upper and lower compliance joints 14 and 16. Therefore, design degree of freedom may be improved in comparison with a conventional busing scheme.

In the instant case, the rear lower inner joint 12 may be formed to show a low stiffness to a motion around the upper and lower compliance joints 14 and 16, and to show a high stiffness along the extension line L2 of the compliance control arm CCA.

When a braking force is applied to the wheel WH, the rear lower inner joint 12 rotates along rotational trajectory around an axis of the upper and lower compliance joints 14 and 16. Since a very low stiffness is applied along such a direction, compliance characteristics in a response to the braking force may be easily designed through the compliance control arm CCA.

That is, when the braking force is applied, the rear lower inner joint 12 moves rearward thereof, and a rotational motion of the lower control arm LCA is caused in a counterclockwise in the drawing, a tow-in behavior of the wheel WH is induced. It may be understood that the amount of rearward movement of the rear lower inner joint 12 may be designed such that vehicle dynamic characteristics against a road impact may be improved.

Furthermore, a spin resistivity of a vehicle may be improved in comparison with a double wishbone type or multi-link type suspension, and spatial utility may also be improved.

Compliance characteristics in a response to a lateral force may depend on an arrangement direction or location of the compliance control arm CCA. In a response to the lateral force, the compliance control arm CCA is forced to rotate around the instantaneous rotation center IC by a torque induced by the lateral force with respect to the instantaneously rotation center IC. Therefore, when the instantaneous rotation center IC of the lower control arm LCA is located externally rearward of the wheel WH, the lateral force forces the wheel WH to rotate counterclockwise in the drawings, causing a tow-in behavior of the wheel WH.

As described above, according to a suspension system for a vehicle according to various exemplary embodiments of the present invention, the instantaneous rotation center IC of the lower control arm LCA may be located to a desired location by appropriately designing an arrangement direction of the front lower inner joint 10 and arrangement direction and location of the compliance control arm CCA. Furthermore, desired compliance dynamic characteristics of the wheel WH may be obtained by appropriately locating the instantaneous rotation center IC of the lower control arm LCA.

Figure 3:
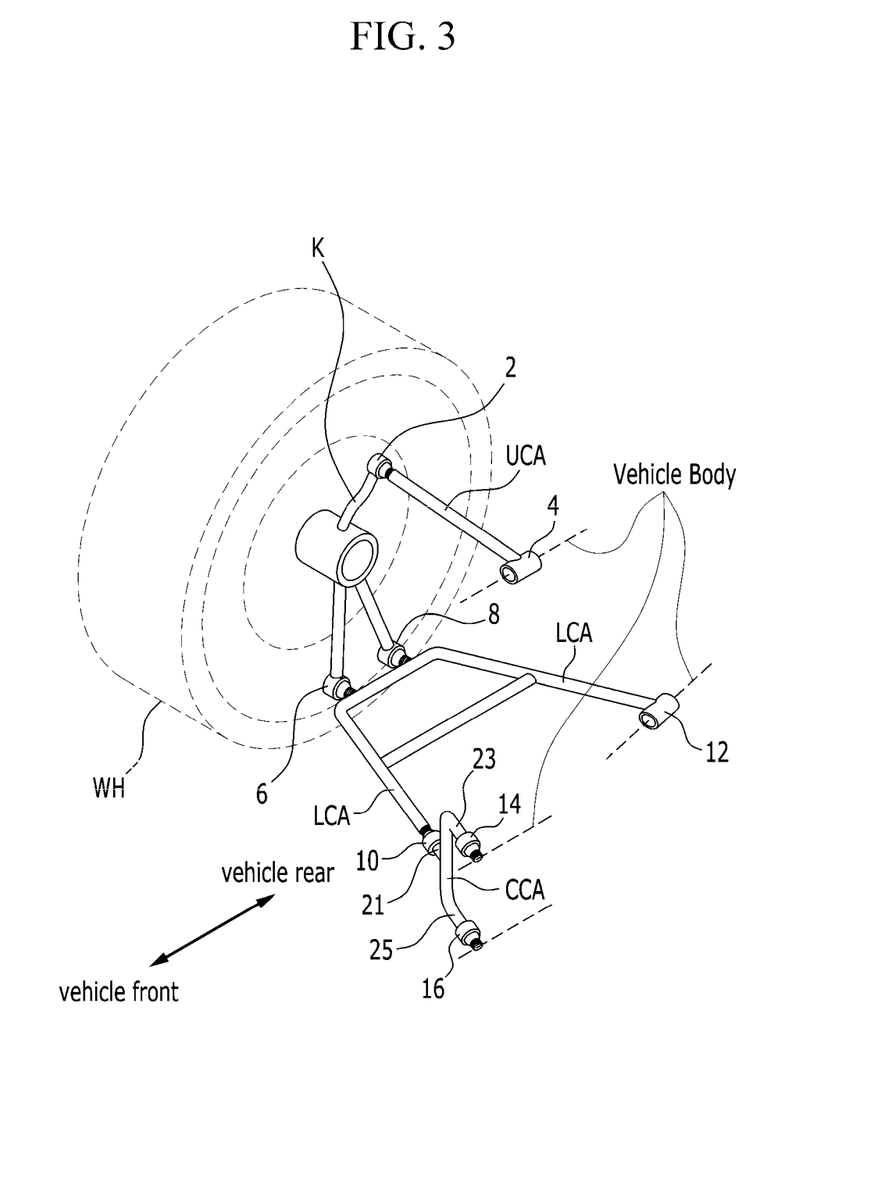
FIG. 3 is a perspective view of a suspension system for a vehicle according to various exemplary embodiments of the present invention.

FIG. 3 is a perspective view of a suspension system for a vehicle according to various exemplary embodiments of the present invention.

Referring to FIG. 3, a suspension system for a vehicle according to various exemplary embodiments of the present invention utilizes an upper control arm as a camber control link, and an H-arm as a lower control arm, the same as in the various exemplary embodiments.

A suspension system for a vehicle according to various exemplary embodiments of the present invention includes a knuckle K, an upper control arm UCA, a lower control arm LCA, and a compliance control arm CCA. The suspension system also includes a damping device including a coil spring and a shock absorber.

A suspension system for a vehicle according to various exemplary embodiments of the present invention is not limited to a specific example, but may be applicable to another type of suspension, e.g., a MacPherson strut type suspension, a double wishbone type suspension, or a multi-link type suspension, having a lower control arm (or a lower arm) LCA to which a compliance control arm CCA is applicable.

The knuckle K and the upper control arm UCA may be formed to the same as the various exemplary embodiments of FIG. 1.

The lower control arm LCA may be formed as a single arm or two arms, and is realized as an H-arm, the same as in the various exemplary embodiments of FIG. 1.

Although the various exemplary embodiments of the present invention utilizes an H-arm as the lower control arm LCA, it may be understood that the present invention is not limited thereto, and the compliance control arm CCA may be applicable to an A-arm having one connection point at a knuckle side and two connections points at a vehicle body side thereof.

The lower control arm LCA is disposed in a vehicle's width direction thereof. Two wheel-side end portions are connected to bottom portion of the knuckle K through a front lower external joint 6 and a rear lower external joint 8.

Among two vehicle body-side end portions of the lower control arm LCA, a vehicle body-side rear end portion is connected to the vehicle body through a rear lower inner joint 12.

A vehicle body-side front end portion of the lower control arm LCA is connected to the vehicle body through a front lower inner joint 10 and a compliance control arm CCA.

The compliance control arm CCA includes a wheel-side connection end portion 21 facing the wheel WH and two vehicle body-side connection end portions 23 and 25 bifurcating from the wheel-side connection end portion 21 toward the vehicle body.

A front lower inner joint 10 is formed at the wheel-side connection end portion 21, and the wheel-side connection end portion 21 of the compliance control arm CCA is connected to the vehicle body-side front end portion of the lower control arm LCA through the wheel-side connection end portion 21. Two compliance joints 14 and 16 are formed at the two bifurcated vehicle body-side connection end portions 23 and 25, and the compliance control arm CCA is connected to the vehicle body through the compliance joints 14 and 16.

The two compliance joints 14 and 16 include an upper compliance joint 14 and a lower compliance joint 16. The upper and lower compliance joints 14 and 16 are vertically apart and are connected to the vehicle body.

The upper and lower compliance joints 14 and 16 being vertically apart does not necessarily mean that the upper and lower compliance joints 14 and 16 are disposed in an exactly vertical direction.

The upper and lower compliance joints 14 and 16 may be respectively formed as ball joints, however, are not limited thereto. Another element such as a bushing which may deform to vary an angle between the vehicle body and the compliance control arm CCA may be applicable as the upper and lower compliance joints 14 and 16.

In an exemplary embodiment of the present invention, drawings illustrate that ball joints are used for the upper external joint 2 of the upper control arm UCA, the front and rear lower external joints 6 and 8 and front lower inner joint 10 of the lower control arm LCA, and the upper and lower compliance joints 14 and 16.

Furthermore, the drawings illustrate that bushings are used for the upper inner joint 4 of the upper control arm UCA and the rear lower inner joint 12 of the lower control arm LCA.

As known in the art, a bushing includes a rubber material fitted between internal and external pipes of smaller and larger diameters, and such a bushing absorbs a load exerted to the wheel in length and width directions of a vehicle by deforming of the rubber material.

As known in the art, a ball joint includes a stud having a metal ball integrally formed with a rod and a socket spherically contacting the metal ball. In such a ball joint, the metal ball is rotatable with respect to the socket to provide relative motion of parts linked by the ball joint, and provides high strength against an applied force.

According to such a suspension system for a vehicle, when the wheel WH kinematically moves along a vertical direction, the compliance control arm CCA becomes stationary. Therefore, in the instant case, the lower control arm LCA of an H-arm type moves as if the front lower inner joint 10 is fixed to the vehicle body.

Furthermore, the upper control arm UCA may adjust an instantaneous rotation center in a front view, as a function of a camber control link.

Figure 4:
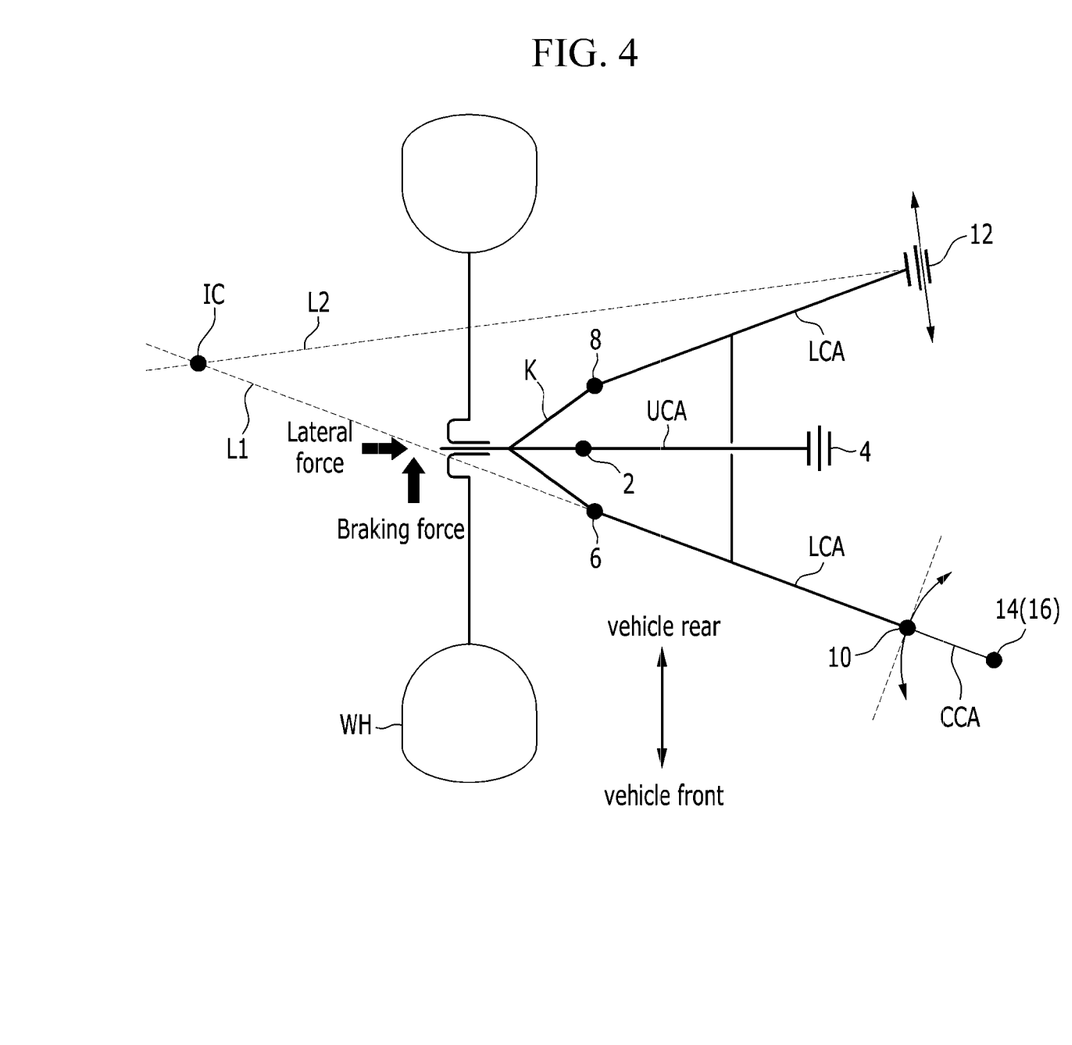
FIG. 4 is a schematic plan view of a suspension system for a vehicle according to various exemplary embodiments of the present invention.

FIG. 4 is a schematic plan view of a suspension system for a vehicle according to various exemplary embodiments of the present invention.

Referring to FIG. 4, the lower control arm LCA receives the driving torque and the braking force by torsion and bending, and the compliance dynamic characteristics of the wheel WH may be estimated based on an instantaneous rotation center IC. To increase tow-in behavior characteristics of the wheel WH while the lateral force and the braking force act on the wheel WH, an instantaneous rotation center IC of the lower control arm LCA is located external rear of the wheel WH.

The instantaneous rotation center IC of the lower control arm LCA is determined by the arrangement direction of the rear lower inner joint 12 and the arrangement direction and location of the compliance control arm CCA.

The front lower inner joint 10 may rotationally move around the upper and lower compliance joints 14 and 16 that are rear-side connection portions to the vehicle body. That is, the front lower inner joint 10 may move along a line perpendicular to a straight line connecting the front lower inner joint 10 and the upper and lower compliance joints 14 and 16, as illustrated by an arrow across the front lower inner joint 10. That is, the front lower inner joint 10 instantaneously moves perpendicularly to an extension line L1 formed by the compliance control arm CCA.

The rear lower inner joint 12 forming the rear-side connection portion to the vehicle body may move along an axial direction of a bushing disposed therein, as illustrated by a straight arrow across the rear lower inner joint 12.

When an external force such as a lateral force or a braking force is applied to wheel WH, the lower control arm LCA may move according to compliance dynamic characteristics determined by the front-side and rear-side connection portions to the vehicle body.

In the instant case, the instantaneous rotation center IC of the lower control arm LCA is formed at a point where the two extension lines L1 and L2.

Therefore, when a lateral force and/or a braking force is applied to the wheel WH, a compliance motion of the compliance control arm CCA is caused, where the compliance control arm CCA rotates around the upper and lower compliance joints 14 and 16. Therefore, design degree of freedom may be improved in comparison with a conventional busing scheme.

In the instant case, the front lower inner joint 10 may be formed to show low resistance to a motion around the upper and lower compliance joints 14 and 16, and to show a high stiffness along the extension line L1 of the compliance control arm CCA.

When a braking force is applied to the wheel WH, the front lower inner joint 10 rotates along rotational trajectory around an axis of the upper and lower compliance joints 14 and 16. Since a very low stiffness is applied along such a direction, compliance characteristics in a response to the braking force may be easily designed through the compliance control arm CCA.

That is, when the braking force is applied, the front lower inner joint 10 moves rearward thereof, and a rotational motion of the lower control arm LCA is caused in a counterclockwise in the drawing, a tow-in behavior of the wheel WH is induced. It may be understood that the amount of rearward movement of the rear lower inner joint 12 may be designed such that vehicle dynamic characteristics against a road impact may be improved.

Furthermore, a spin resistivity of a vehicle may be improved in comparison with a double wishbone type or multi-link type suspension, and spatial utility may also be improved.

Compliance characteristics in a response to a lateral force may depend on an arrangement direction or location of the compliance control arm CCA. In a response to the lateral force, the compliance control arm CCA is forced to rotate around the instantaneous rotation center IC by a torque induced by the lateral force with respect to the instantaneously rotation center IC. Therefore, when the instantaneous rotation center IC of the lower control arm LCA is located externally rearward of the wheel WH, the lateral force forces the wheel WH to rotate counterclockwise in the drawings, causing a tow-in behavior of the wheel WH.

As described above, according to a suspension system for a vehicle according to various exemplary embodiments of the present invention, the instantaneous rotation center IC of the lower control arm LCA may be located to a desired location by appropriately designing an arrangement direction of the rear lower inner joint 12 and arrangement direction and location of the compliance control arm CCA. Furthermore, desired compliance dynamic characteristics of the wheel WH may be obtained by appropriately locating the instantaneous rotation center IC of the lower control arm LCA.

Therefore, according to a suspension system for a vehicle according to various exemplary embodiments of the present invention, a compliance behavior of a vehicle may be improved without altering vertical kinematic behavior of the wheel WH.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A suspension system for a vehicle, the suspension system comprising:
    a knuckle configured of rotatably supporting a wheel of the vehicle; and
    at least one control arm mounted along a vehicle width direction and connecting the knuckle and a vehicle body, the at least one control arm including a lower control arm mounted between the knuckle and the vehicle body,
    wherein the lower control arm includes:
        a wheel-side end portion connected to a lower portion of the knuckle through a front lower external joint and a rear lower external joint; and
        two vehicle body-side end portions connected to the vehicle body through a front lower inner joint and a rear lower inner joint, the two vehicle body-side end portions including first and second vehicle body-side end portions, and
    wherein the first vehicle body-side end portion among the two vehicle body-side end portions is connected to the vehicle body, interposing a compliance control arm between the first vehicle body-side end portion of the lower control arm and the vehicle body,
    wherein the compliance control arm includes:
        a wheel-side connection end portion connected to the first vehicle body-side end portion of the lower control arm; and
        two vehicle body-side connection end portions including first and second vehicle body-side connection end portions and bifurcated from the wheel-side connection end portion of the compliance control arm toward the vehicle body and connected to the vehicle body, and
    wherein the first vehicle body-side end portion of the two vehicle body-side end portions of the lower control arm connected to the wheel-side connection end portion of the compliance control arm is positioned rearward of the second vehicle body-side end portion of the two vehicle body-side end portions of the lower control arm.

2. The suspension system of claim 1,
    wherein the wheel-side connection end portion of the compliance control arm is connected to the first vehicle body-side end portion of the lower control arm through the rear lower inner joint, and
    wherein the two vehicle body-side connection end portions of the compliance control arm are connected to the vehicle body through two compliance joints.

3. The suspension system of claim 2,
    wherein the front lower inner joint and the compliance control arm are aligned such that an instantaneous rotation center of the lower control arm is located external and rearward of the wheel center.

4. The suspension system of claim 3,
    wherein the instantaneous rotation center of the lower control arm is located at a point in which a first extension line formed vertical to an axis of the front lower internal joint and a second extension line formed along a longitudinal axis of the compliance control arm are met to each other.

5. The suspension system of claim 2,
    wherein the two compliance joints include upper and lower compliance joints that are vertically apart with respect to each other.

6. The suspension system of claim 2,
    wherein each of the two compliance joints includes a ball joint or a bushing.

7. The suspension system of claim 1,
    wherein the at least one control arm further includes an upper control arm mounted above the lower control arm.

8. The suspension system of claim 7, wherein the upper control arm includes:
    a wheel-side end portion connected to the knuckle; and
    a vehicle body-side end portion connected to the vehicle body.

9. The suspension system of claim 7,
    wherein the wheel-side end portion of the lower control arm is in plural, including two wheel-side end portions, and
    wherein the lower control arm is formed as an H-arm including:
        the two wheel-side end portions connected to the knuckle; and
        the two vehicle body-side end portions connected to the two wheel-side end portions and the vehicle body.

10. The suspension system of claim 1,
    wherein each of the front lower inner joint and the rear lower inner joint includes a bushing or a ball joint.

11. The suspension system of claim 1, wherein the wheel-side end portion of the lower control arm is connected to the two vehicle body-side end portions to form a shape of trapezoid.

12. The suspension system of claim 1, wherein the two vehicle body-side end portions of the lower control arm are connected by a reinforcement member.

13. A suspension system for a vehicle, the suspension system comprising:
    a knuckle configured of rotatably supporting a wheel of the vehicle; and
    at least one control arm mounted along a vehicle width direction and connecting the knuckle and a vehicle body, the at least one control arm including a lower control arm mounted between the knuckle and the vehicle body,
    wherein the lower control arm includes:
        a wheel-side end portion connected to a lower portion of the knuckle through a front lower external joint and a rear lower external joint; and
        two vehicle body-side end portions connected to the vehicle body through a front lower inner joint and a rear lower inner joint, the two vehicle body-side end portions including first and second vehicle body-side end portions, and wherein the first vehicle body-side end portion among the two vehicle body-side end portions is connected to the vehicle body, interposing a compliance control arm between the first vehicle body-side end portion of the lower control arm and the vehicle body,
wherein the compliance control arm includes:
a wheel-side connection end portion connected to the first vehicle body-side end portion of the lower control arm; and
two vehicle body-side connection end portions including first and second vehicle body-side connection end portions and bifurcated from the wheel-side connection end portion of the compliance control arm toward the vehicle body and connected to the vehicle body,
wherein the first vehicle body-side end portion of the two vehicle body-side end portions of the lower control arm connected to the wheel-side connection end portion of the compliance control arm is positioned forward of the second vehicle body-side end portion of the two vehicle body-side end portions.

14. The suspension system of claim 13,
wherein the wheel-side connection end portion of the compliance control arm is connected to the first vehicle body-side end portion of the lower control arm through the front lower inner joint, and
wherein the two vehicle body-side connection end portions of the compliance control arm are connected to the vehicle body through two compliance joints.

15. The suspension system of claim 14,
wherein the rear lower inner joint and the compliance control arm are aligned such that an instantaneous rotation center of the lower control arm is located external and rearward of the wheel center.

16. The suspension system of claim 15,
wherein the two compliance joints include upper and lower compliance joints that are vertically apart with respect to each other.

17. The suspension system of claim 15,
wherein the instantaneous rotation center of the lower control arm is located at a point in which a first extension line formed vertical to an axis of the rear lower internal joint and a second extension line formed along a longitudinal axis of the compliance control arm are met to each other.

18. The suspension system of claim 14,
wherein each of the two compliance joints includes a ball joint or a bushing.

19. The suspension system of claim 13, wherein the two vehicle body-side end portions of the lower control arm are connected by a reinforcement member.

* * * * *